United States Patent Office 3,316,104
Patented Apr. 25, 1967

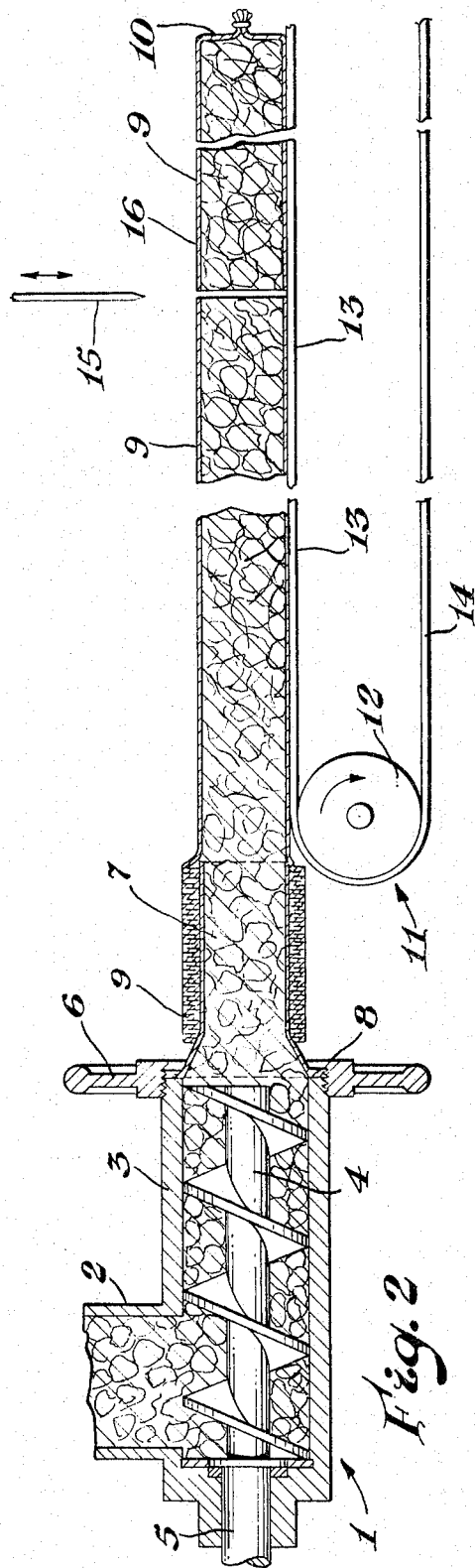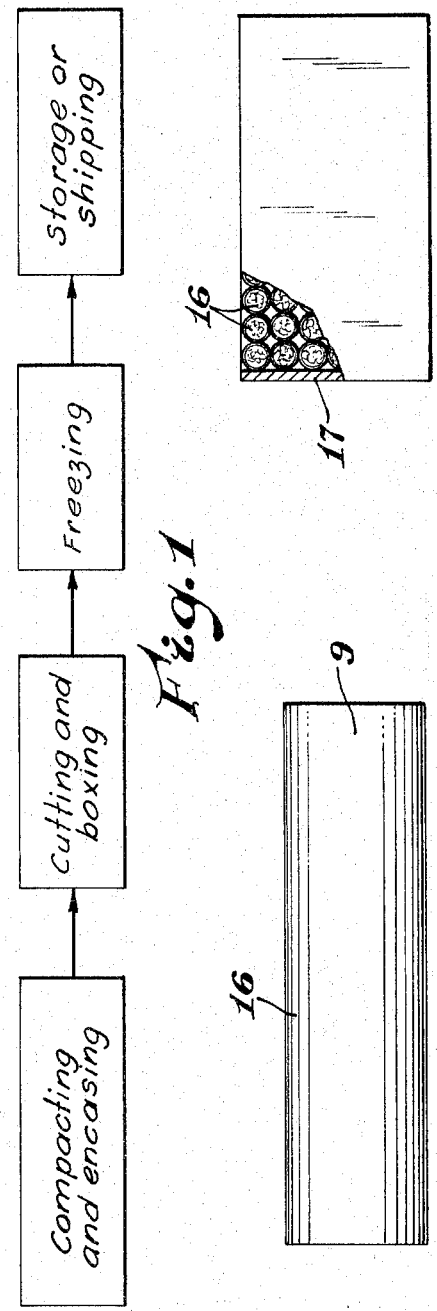

3,316,104
METHOD OF PROCESSING BONELESS MEAT PIECES FOR SUBSEQUENT GRINDING
Robert C. Lugiewicz, Saginaw, Mich., assignor to Cubb-Pac Corporation, Pittsburgh, Pa., a corporation of Delaware
Filed Apr. 3, 1964, Ser. No. 357,128
5 Claims. (Cl. 99—194)

This invention relates to the processing of meat products and the products produced thereby, and more particularly to the processing of pieces of boneless meat by meat packers for shipment to and use by meat retailers.

Boneless beef constitutes the largest single meat product consumed today in the United States. An extremely large percentage of boneless beef ultimately is ground for hamburger and by far the greater percentage of such boneless beef is packed by meat packers in frozen blocks for shipment to meat markets. The frozen blocks of boneless beef vary in weight from 40 to 70 pounds, an average size block weighing about 60 pounds. The use of such blocks has a number of disadvantages, not the least of which is the difficulty experienced by butchers in handling blocks of such size and weight.

One of the most significant disadvantages in the use of frozen blocks of boneless meat is the waste resulting from the necessity of having to cut the block into strips or pieces of such size as to be accommodated by a meat grinder or chopper. A butcher cannot cut a frozen block of boneless beef with a knife, but must saw pieces from the block by means of a band or other saw. The sawing of strips from the block results in sawdust which, of course, is composed of meat. Such sawdust is pulverized or powdered and cannot be included in meat to be ground for the reason that it makes the ground meat mushy and undesirable in both taste and appearance. Consequently, the sawdust represents a complete waste of meat. It is not unusual for a full pound of meat to be dissipated as sawdust in the sawing of a 50- to 60-pound block, and the resulting loss of money over a week's time can be substantial.

Another severe disadvantage resulting from having to saw up large blocks of frozen meat is the time required of the butcher in sawing the meat. Butchers are skilled workmen and consequently command high wages. The time required for a butcher to saw a 50- to 60-pound block of frozen meat is substantial and, accordingly, reflects a considerable cost in the operation of the market.

In addition to the foregoing, there are numerous other disadvantages of the present practice. For example, the sawing of frozen blocks of meat necessitates the purchase of a saw. The sawing of frozen meat blocks imposes considerable strain and wear on the parts of the saw. As a result, maintenance of the saw is a relatively expensive undertaking.

Apart from the disadvantages of frozen meat blocks described above, the time required to freeze a 60-pound block of meat is substantial, thereby requiring freezing facilities of considerable proportions. Similarly, it requires considerable time for a large block of frozen meat to thaw, thereby making it necessary for the butcher to devote considerable amounts of valuable space for long periods of time to the thawing of blocks.

An object of this invention is to provide a process for packing boneless meat pieces, particularly beef, in such manner as to eliminate or minimize all the disadvantages referred to above.

Another object of the invention is to provide a meat packing process that is capable of utilization without the necessity of making any substantial changes in the techniques currently employed in packing boneless beef.

A further object of the invention is to provide boneless beef packing process which may be practiced with conventional machinery of inexpensive construction.

Another object of the invention is to provide boneless beef packing process which avoids the necessity of a butcher's subsequently having to saw the meat.

A further object of the invention is to provide a boneless beef packing process which facilitates the handling of the boneless beef from the packer to the retailer.

Another object of the invention is to provide a boneless beef packing process which costs little, if any, more than current packing processes.

Another object of the invention is to provide a boneless beef product for use by butchers and which may be converted from its frozen form to ground form with such facility and in so little time as to enable the butcher to effect substantial monetary savings in the operation of his market.

A further object of the invention is to provide a boneless beef product which may be maintained in frozen form until just before it is to be used, thereby enabling a butcher to have better flexibility in judging the amount of beef that must be ground in a given period of time, and resulting in a greater percentage of the butcher's ground beef being capable of display in its bloom condition.

Other objects and advantages of the invention will be pointed out specifically or will become apparent from the following description when it is considered in conjunction with the appended claims and the accompanying drawings, in which:

FIGURE 1 is a flow diagram illustrating the main characteristics of the process;

FIGURE 2 is a sectional view of apparatus particularly adapted for use in practicing the process;

FIGURE 3 is a side elevational view of a product of the process; and

FIGURE 4 is an end elevational view, on a reduced scale, of a container filled with products formed in accordance with the process, parts of the container being broken away for purposes of illustration.

Most commercial meat packing installations are so arranged that beef sides or quarters are delivered to boning tables at which the meat is boned and cut or slashed into pieces or strips and packed in trays or boxes. The trays are of considerable capacity, ranging from 40 to 70 pounds, and, when full, are carried to a freezer where the contents of each tray are frozen into a block for subsequent delivery to a meat market.

It is contemplated that the practice of the method hereinafter to be disclosed will require no modification of the present packing house arrangement, although it is preferable that certain additional machinery of substantially conventional construction be incorporated to facilitate the practice of the method. One such piece of additional machinery is a meat chopper or grinder 1 which may be any one of a number of currently available kinds.

The chopper 1 includes the usual pan or tray (not shown) mounted at the upper end of a bowl 2 that communicates at its lower end with a generally horizontal cylinder 3 in which is rotatably mounted a feed screw 4. To one end of the feed screw 4 is fixed a drive shaft 5 that is connected to and driven by an electric motor (not shown) in the usual manner. The opposite end of the feed screw 4 terminates adjacent the open end of the cylinder 3. The meat chopper, as supplied by the manufacturer, normally includes a perforated die plate (not shown) adapted to be mounted at the open end of the cylinder 3 and removably secured by a retaining ring 6 that is removably threaded on the cylinder 3. The chopper as normally supplied by the manufacturer also includes one or more knives (not shown). In the operation of a conventional meat chopper, pieces of meat are introduced to the cylinder 3 via the tray and the bowl 2, the screw 4 feeding the meat toward the open end of the cylinder 3 where it is cut by the rotating knives and extruded through the perforations of the die plate. In practicing the method of the invention, the die plate and the knives are eliminated, but otherwise the chopper remains the same.

In lieu of the die plate with which a meat chopper conventionally is equipped, there is provided a funnel shaped member comprising an elongated sleeve or tube portion 7 provided with a flange 8 at one end which is engaged by the ring 6 and retained at the open end of the cylinder 3. The inside diameter of the tubular member 7, although smaller than the diameter of the cylinder 3, should be so selected that it corresponds to twice the distance from the dedendum circle of the screw 4 to the inner surface of the cylinder 3. The cross-sectional area of the tubular element 7, therefore, is substantially the same as the usable cross-sectional area of the cylinder 3.

The length of the tubular element 7 may vary according to certain considerations hereinafter referred to but it should be of such length as to accommodate on its outer surface a tubular synthetic or edible casing 9 of substantial length. The end of the casing that is located adjacent the free end of the tube 7 at the beginning of a packing operation preferably is closed initially as is indicated at 10. The end of the casing may be tied closed or simply held closed by the operator.

Preferably, the free end of the tubular element 7 terminates adjacent and slightly above one end of an endless, receiving conveyor belt 11 trained around driving rolls 12 and having upper and lower runs 13 and 14, respectively. The length of the upper run 13 of the conveyor may vary according to the available space, but in any event it need not be longer than the stretched out length of the casing 9.

In the operation of the apparatus described thus far, an elongated casing 9 will be fitted over the tubular member 7 with the closed end of the casing as close as possible to the free end of the sleeve 7. Thereafter, strips or pieces of slashed boneless beef may be introduced to the cylinder 3 via the bowl 2 so as to be engaged by the feed screw 4 and delivered in generally tubular form to the interior of the tubular member 7. Meat thus delivered to the tube 7 are discrete pieces or strips in the sense that they are not cut or comminuted as is chopped or ground meat, instead the meat pieces or strips retain their identity as such, but are compacted in the tube.

The length of the tube 7 should be great enough to effect radially inward compaction of the meat pieces into a substantially solid bar, but should not be so long that feeding of the meat out of the cylinder 3 generates excessive frictional heat between the feed screw and the meat particles in engagement therewith. Excessive frictional heat is that heat which will cause the meat particles to discolor objectionably, and the length of the tube 7 necessary to provide adequate compaction without excessive heat generation necessarily will depend upon the two diameters of the cylinder 3 and the tube 7, the speed of rotation of the driving motor and the feed screw 4, and the rate of feed of meat pieces to the chopper. The problem of avoiding excessive heat is overcome largely by the relationship heretofore referred to between the diameter of the tube 7 and the dedendum circle of the screw 4.

Meat compacted in the tube 7 is discharged therefrom into the casing 9, still in solid bar form. The first meat discharged from the tube at the beginning of the operation bears against the closed end 10 of the casing and causes the latter to begin to move off the tube 7. As the length of the bar of meat being discharged from the tube 7 increases, the encased bar will engage and be supported by the upper run 13 of the conveyor belt 11 which will convey the bar away from the meat chopper. The speed of movement of the upper run 13 of the conveyor belt should be so selected that it corresponds substantially to the rate of flow of compacted meat from the tube 7, thereby avoiding imposing on the feed screw 4 and its driving motor the load of having to effect movement of the full length of the bar of meat extruded from the cylinder 3. Movement of the bar of meat away from the chopper at substantially the speed of extrusion of the bar also assists in maintaining the bar at a substantially uniform diameter.

It is not necessary that the extruded bar of meat be received on a conveyor. Instead, the bar could be received on a smooth top table or the like, and an attendant move the bar along the table at the speed of extrusion.

At a suitable distance from the discharge end of the compacting tube 7, the extruded bar of meat may be cut by a knife 15. The knife may be rotary and supported on an overhead arbor (not shown) for vertical movement or, alternatively, the knife may be wielded manually. In either event, the extruded bar of compacted meat particles is cut into a plurality of substantially uniform lengths or sticks 16 which may be packed in a box 17.

The diameter and length of a stick 16 may be varied within certain limits. The diameter of a stick 16 should be somewhat less than the diameter of the bowl of a meat chopper such as is used by a meat market, so as to enable the stick of meat to be fed directly to the meat chopper without the necessity of its being sliced longitudinally. Most markets use choppers of about the same size, so for all practical purposes the diameters of sticks 16 will be uniform and such as to be accommodated by the conventional chopper. The length of the stick 16 will depend on the length that is convenient to handle, but probably should be no greater than two feet for maximum ease in handling, although it is not intended to limit the length of individual sticks to any particular size.

The point or zone at which the extruded bar of meat is cut to form a stick should be sufficiently downstream far from the discharge end of the tube 7 as to avoid any risk that meat subsequently extruded from the tube 7 will cause expulsion of previously extruded meat from within the casing 9 upstream of the cutting zone. Such a result can be avoided by cutting the bar at a point one foot or more downstream from the free end of the tube 7.

After a predetermined number of sticks of meat have been packed in a box 17, the latter may be taken to a freezer where its contents are frozen. The frozen meat sticks then may be held in frozen storage or shipped in refrigerated trucks or railroad cars to the customer.

If desired, the conveyor belt 11 may be run through a quick-freeze unit prior to removal of the cut sticks 16 therefrom for boxing. Thus, the steps of boxing and freezing may be reversed.

When the frozen sticks 16 are delivered to a customer such as a meat market, the boxes of meat sticks may be stored in the market's refrigerator until about half an hour prior to use, at which time one or more boxes or a selected number of meat sticks may be removed from the freezer to begin thawing. Inasmuch as a stick having a diameter of 1½ to 2 inches will thaw considerably faster than a 50- or 60-pound block of meat, much less time is required to condition meat sticks 16 for grinding than is required to condition a block of frozen meat for grinding.

When a stick of meat is in condition for grinding, it may be taken by the butcher to the grinder. If the casing 9 is edible, both the stick and the casing may be introduced to the grinder. If the casing is not edible, it is a simple matter for the butcher to slit the casing with a knife and separate it from the meat, subsequently feeding the stick of frozen meat to the grinder.

From the foregoing, it will be apparent that sawing of the frozen meat sticks is not necessary. Moreover, it is considerably easier for meat sticks 16 to be handled than it is to handle large and heavy blocks of meat. Further, the amount of time and electrical energy required to freeze meat sticks is less than is required to freeze larger blocks. Similarly, less time is required to thaw the meat sticks, so a butcher need not grind large quantities of meat at one time. As a result, he is able to display meat more advantageously.

It has been found that the sawing of meat blocks of the kind hereinbefore described results in the generation of heat adjacent the saw blade. The heat absorbed by the meat promotes bacterial activity, and such bacterial activity limits the time that meat can be advantageously displayed. Since meat processed in accordance with the invention need not be sawed, it is possible to display such meat for considerably longer periods. In other words, meat processed according to the invention has a greater case life.

The disclosed process, product and apparatus are representative of presently preferred form thereof according to the invention, but this disclosure is intended to be illustrative rather than definitive of the invention. The invention is defined in the claims.

I claim:

1. A method of processing boneless meat pieces for subsequent grinding comprising forming said pieces into an annular tube; driving said tube in one direction; compacting said tube radially inwardly to form a substantially solid bar of substantially uniform diameter and adapted to be accommodated in a meat grinder; extruding said bar into an elongated casing; supporting and moving the encased bar in the direction and at substantially the speed of its extrusion; and slicing said encased bar into substantially uniform lengths of between one and two feet.

2. The method set forth in claim 1 including freezing said lengths.

3. A method of processing boneless meat pieces for subsequent grinding comprising forming said pieces into an annular tube; driving said tube in one direction; compacting said tube radially inwardly to form a substantially solid bar of substantially uniform diameter and adapted to be accommodated in a meat grinder; extruding said bar; encasing said bar as it is extruded; supporting and moving said encased bar in the direction and at substantially the speed of its extrusion; slicing said encased bar into substantially uniform lengths of between one and two feet; and grinding said lengths.

4. A method of processing boneless meat pieces for subsequent grinding comprising forming said pieces into an annular tube; driving said tube in one direction; compacting said tube radially inwardly to form a substantially solid bar of substantially uniform diameter and adapted to be accommodated in a meat grinder; extruding said bar; encasing said bar as it is extruded; supporting and moving said encased bar in the direction and at substantially the speed of its extrusion; slicing said encased bar into substantially uniform lengths of between one and two feet; freezing said lengths; at least partially thawing said lengths; and grinding said at least partially thawed lengths.

5. A method of processing boneless meat pieces for subsequent grinding comprising compacting said pieces of meat in solid bar form; extruding said bar; feeding said bar into a casing as said bar is extruded; supporting and moving the encased bar in the direction of its extrusion and at substantially the speed of extrusion; cutting the moving encased bar into elongated, substantially uniform lengths, the cutting of said bar occurring at a distance spaced sufficiently downstream from the entry of said bar into said casing to preclude expulsion of meat pieces from said casing upstream from where the casing is cut; and freezing said lengths.

References Cited by the Examiner
UNITED STATES PATENTS

| | | | |
|---|---|---|---|
| 1,810,864 | 6/1931 | Vogt | 99—137 X |
| 1,864,285 | 6/1932 | Taylor | 99—195 |
| 2,020,843 | 11/1935 | Lohner | 99—194 X |
| 2,134,862 | 11/1938 | Dunnham | 17—33 X |
| 2,773,773 | 12/1956 | Harder et al. | 99—176 |
| 2,785,074 | 3/1957 | Weingand | 99—176 |
| 3,011,895 | 12/1961 | Toepper et al. | 99—107 |
| 3,134,681 | 5/1964 | Hawley | 99—107 X |

A. LOUIS MONACELL, *Primary Examiner.*

HYMAN LORD, *Examiner.*